United States Patent Office 3,745,145
Patented July 10, 1973

3,745,145
STABILIZED MELT-PROCESSABLE ETHYLENE/
CHLOROTRIFLUOROETHYLENE COPOLYMER
COMPOSITIONS
Ghazi Khattab, Parsippany, and Alfred Stoloff, Livingston, N.J., assignors to Allied Chemical Corporation, New York, N.Y.
No Drawing. Filed Mar. 16, 1971, Ser. No. 124,913
Int. Cl. C08f 45/62
U.S. Cl. 260—45.75 XA                16 Claims

ABSTRACT OF THE DISCLOSURE

About equimolar ethylene/chlorotrifluoroethylene copolymer compositions are stabilized against thermal degradation so as to render them melt-processable by incorporating therein a stabilizing system comprising (a) a phosphite of an organic polyhydric phenol; (b) a salt of a carboxylic acid and a metal of Group II of the Periodic Table; (c) a thio dipropionic acid ester or alkali metal salt.

BACKGROUND OF THE INVENTION

This invention relates to stabilized, melt-processable ethylene/chlorotrifluoroethylene copolymer compositions, especially of about equimolar ethylene/chlorotrifluoroethylene copolymers, and more particularly, to a process for stabilizing about equimolar ethylene/chlorotrifluoroethylene copolymers against degradation during fabrication and use at elevated temperatures.

About equimolar ethylene/chlorotrifluoroethylene copolymers exhibit outstanding mechanical, electrical and chemical properties at high temperatures. For example, about equimolar ethylene/chlorotrifluoroethylene copolymers resist attack of most organic solvents at ambient as well as elevated temperatures, being only slightly soluble at 100°–150° C. in 2,5-dichlorobenzotrifluoride/benzonitrile or O-dichlorobenzene mixtures of 10:90 to 50:50 volume ratio. They are insoluble in bases and acids, including fuming nitric acid. These copolymers also possess high tensile strength and have melting points above about 220° C. and as high as about 260° C., which melting points are higher than those of the homopolymers of either ethylene (as high as 130° C.) or chlorotrifluoroethylene (as high as 215° C.). About equimolar ethylene/chlorotrifluoroethylene copolymers also have outstanding electrical properties. For all of these advantageous properties, they are eminently suitable for making useful articles, such as valves, gaskets, pipes, wire insulation, sheets or films for use in applications where their excellent mechanical, electrical and chemical properties can be used to advantage. Up to now, however, such ethylene/chlorotrifluoroethylene copolymer compositions have not found significant commercial use because they are inherently thermally unstable so that they cannot readily be fabricated by conventional melt-processing operations, as extrusion or injection molding. About equimolar ethylene/chlorotrifluoroethylene homopolymers, due to their high melting points in excess of about 220° C., require melt fabrication temperatures of above about 250° C., usually within the range of between about 260° C. to 320° C. At these high temperatures rapid degradation of the polymer occurs resulting in discoloration and loss of chemical, mechanical and electrical properties. In particular, degradation of these properties occurs during extrusion and injection molding operations.

Stabilizers which have been proposed to retard thermal degradation of trifluorochloroethylene polymers, such as zinc oxide, hydroquinone, chloranil, or mixtures thereof do not provide adequate stabilization of about equimolar ethylene/chlorotrifluoroethylene copolymers even when employed in amounts well above those in which such stabilizers are conventionally employed. Moreover, when zinc oxide is used in amount in excess of about 1% by weight of the polymer, the product is rendered white and opaque and has inferior mechanical and electrical properties. Use of hydroquinone and/or chloranil in amount above about .5% by weight of the polymer, either alone or in combination with zinc oxide, causes formation of bubbles and intense discoloration in the polymer.

Stabilizers commonly used to retard thermal degradation of polyethylene, such as butylated hydroxy toluene, 1,1,3 - tris(2-methyl-4-hydroxy-5-tert.butylphenyl)butane or 4,4-n-butylidene-bis(6-tert.butyl-m-cresol) do not provide protection against thermal degradation during melt processing of ethylene/chlorotrifluoroethylene copolymers, especially about equimolar ethylene/chlorotrifluoroethylene copolymers having melting points in excess of about 220° C.

It is an object of the present invention to provide a process for improving the thermal stability of ethylene/chlorotrifluoroethylene copolymers.

Another object of the invention is to provide melt-processable compositions comprising ethylene/chlorotrifluoroethylene copolymers and stabilizers therefor.

More specifically, it is an object of the present invention to provide a process for improving the thermal stability of about equimolar ethylene/chlorotrifluoroethylene copolymers, and to provide melt-processable compositions comprising about equimolar ethylene/chlorotrifluoroethylene copolymers.

It is a further object of the present invention to provide melt-processable compositions comprising about equimolar ethylene/chlorotrifluoroethylene which are also resistant to thermal degradation on long term exposure to elevated temperatures.

Other objects and advantages will become apparent to those skilled in the art from the following description and disclosure.

DESCRIPTION OF THE INVENTION

In accordance with the present invention, the thermal stability of ethylene/chlorotrifluoroethylene copolymers is improved by intimately dispersing within the polymer a three-component stabilizing mixture comprising (a) 0.01 to 30 by weight of the polymer of a transesterified reaction product of an organic polyhydric phenol having from 6 to about 50 carbon atoms and an organic phosphite triester free from phenolic hydroxy groups having up to about 60 carbon atoms obtained by transesterification of the phenol and phosphite at an elevated temperature sufficient to form a homogeneous mixture; (b) 0.01 to 10% by weight of the polymer of a salt of a monocarboxylic acid having from about 6 to about 24 carbon atoms and a melt of Group II of the Periodic Table; and (c) 0.01 to 10% by weight of the polymer of an ester or alkali metal salt of thiodipropionic acid.

Although each individual component, or the combination of any two components of the stabilizing mixture fails to effect satisfactory stabilization of ethylene/chlorotrifluoroethylene copolymers, the three-component mixture surprisingly effects excellent stabilization of the polymer against thermal degradation, not only during short-term exposure to elevated temperatures, as encountered during melt-processing, but also in long-term exposure in use in high temperature environments. Moreover, the stabilizing mixtures of the present invention do not adversely affect the physical and electrical properties of these copolymers.

The ethylene/chlorotrifluoroethylene copolymers which may be stabilized in accordance with the present invention are high molecular weight, normally solid, thermoplastic polymers containing between 40 and about 60 mol percent of ethylene units in the molecule and having melting points between about 200 and about 265° C. The stabilizing compositions in accordance with the present invention are particularly advantageous for use in about equimolar ethylene/chlorotrifluoroethylene copolymers containing between about 45 and about 55 mol percent of ethylene units and having melting points above about 220° C.

These copolymers may be prepared by processes well known to those skilled in the art, as described, for example, in Hanford U.S. Pat. 2,392,378, which shows copolymerization of ethylene with chlorotrifluoroethylene in a stirred aqueous medium at superatmospheric pressure using benzoyl peroxide as catalyst; in Nucleonics, September, 1964, pp. 72-74, disclosing formation of a high melting (237° C.) 1:1 alternant copolymer of ethylene and chlorotrifluoroethylene prepared using a radiation catalyst at 0° C.; or British Pat. 949,422, showing bulk copolymerization of ethylene with chlorotrifluoroethylene at temperatures between −80° to +50° C. using oxygen-activated alkyl boron catalyst; or Ragazzini et al. U.S. Pats. 3,371,076 and 3,501,446, respectively relating to methods for making ethylene/chlorotrifluoroethylene copolymers using oxygen-activated boron-containing catalysts and to products obtained by that process. About equimolar ethylene/chlorotrifluoroethylene copolymers having high melting point above 200° C. can also be prepared by batchwise bulk copolymerization of the monomers of temperatures of about 0° C., say between about −20 to +20° C., at superatmospheric pressure in an agitator-equipped pressure vessel by charging the vessel with liquid chlorotrifluoroethylene monomer and bubbling gaseous ethylene into this monomer, using organic peroxide-type initiators, such as trichloroacetyl peroxide and, if desired, adding small amounts of chain transfer agents, such as chloroform or heptane. The desired copolymer products is obtained as a dispersion in the monomer.

The organic polyhydric phenols used to obtain the transesterified reaction product used inthe polymer compositions of the present invention have the formula

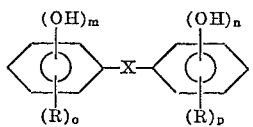

wherein X is selected from the group consisting of oxygen, sulfur, alkylene, alicyclidene, arylidene and mixed alkylenearylidene and alkylene-alicyclidene groups, wherein the aliphatic or cycloaliphatic portion of the molecule may be straight chain or branched chain, having from 1 to about 18 carbon atoms; wherein the R substituents, which may be the same or different, are independently selected from the group consisting of hydrogen and alkyl, straight or branched chain, having from 1 to about 18 carbon atoms; and wherein $m$ and $n$ are integers from 1 to 5, and $o$ and $p$ are integers from 0 to 4, with the proviso that the sums of $m+o$, and $n+p$ may not exceed 5. The OH groups preferably are in ortho and/or para position to X.

Transesterified reaction products of organic polyhydric phenols and organic phosphite triesters suitable for use in the presently claimed invention are described, for example, in U.S. Pats. 3,244,650 and 3,255,136, both issued to Hecker et al. The description of these transesterification products given herein is principally based on that given in Hecker et al.'s U.S. Pat. 3,244,650.

As described in U.S. Pat. 3,244,650, suitable polyhydric phenols include orcinol, catechol, resorcinol, p-octyl resorcinol, p-dodecyl resorcinol, p-octadecyl catechol, p-isooctyl-phloroglucinol, pyrogallol, hexahydroxy benzene, p-isohexyl-catechol, 2,6-ditertiary butyl resorcinol, 2,6-diisopropyl phloroglucinol, methylenebis-(2,6-ditertiary butyl-m-cresol), methylenebis(2,6-ditertiary butyl phenol), 2,2-bis(4-hydroxy phenyl) propane, methylenebis(p-cresol), 4,4'-thiobis(3-methyl-6-tertiary butyl phenol), 2,2'-oxobis-(4-dodecyl phenol), 2,2'-thiobis(4-methyl-6-tertiary butyl phenol), 2,6-diisooctyl resorcinol, 4,4'-n-butylidenebis-(2, 4-butyl-5-methylphenol), 4,4' - benzylidenebis(2-t-butyl)-5-methylphenol), 2,2'-methylenebis-(4-methyl-6-1'-methylcyclohexylphenoyl), 4,4' - cyclohexylidenebis-(2-t-butylphenol), 2,6-bis(2'-hydroxy-3'-t-butyl-5'-methylbenzyl)-4-methylphenol, 4-octyl pyrogallol, and 3,5-ditertiary butyl catechol.

Especially preferred polyhydric phenols are 4,4'-n-butylidene-bis-(6-tert-butyl-m-cresol) and 1,1,3-tris(2-methyl-4-hydroxy-5-tert-butylphenyl)butane.

Organic phosphites suitable for making the transesterified reaction products of organic polyhydric phenol and organic phosphite triester used in the stabilizer compositions of the present invention are also described in U.S. Pat. 3,244,650. They can be any organic phosphite having the formula: $(Ra)_3P$ wherein $a$ is selected from the group consisting of oxygen, sulfur and mixtures thereof, and R is selected from the group consisting of aryl, alkyl, cycloalkyl, aryl-alkyl, alkyl-aryl and combinations thereof. The term "organic phosphite triester," as used herein, includes oxo, thio and mixed oxo-thio phosphites. For reasons of availability, the phosphite will not usually have more than 60 carbon atoms. Exemplary suitable phosphites include those listed in U.S.Pat. 3,244,650, i.e.

monophenyl di-2-ethyl hexyl phosphite,
diphenyl mono-2-ethyl hexyl phosphite,
di-isooctyl monotolyl phosphite,
tri-2-ethyl hexyl phosphite,
phenyl dicyclohexyl phosphite,
phenyldiethyl phosphite,
triphenyl phosphite,
tricresyl phosphite,
tri(dimethylphenyl) phosphite,
trioctadecyl phosphite,
triisooctyl phosphite,
tridodecyl phosphite,
isooctyl diphenyl phosphite,
diisooctyl phenyl phosphite,
tri(t-octylphenyl) phosphite,
tri(t-nonylphenyl) phosphite,
benzyl methyl isopropyl phosphite,
butyl dicresyl phosphite,
isooctyl di(octylphenyl) phosphite,
di(2-ethylhexyl)(isooctylphenyl) phosphite,
tri(2-cyclohexylphenyl) phosphite,
tri-alpha-naphthyl phosphite,
tri(phenylphenyl) phosphite,
tri(2-phenylethyl) phosphite,
tridodecyl thiophosphite,
tri-p-tert-butyl phenyl thiophosphite,
dodecyl thiodiphenyl phosphite and
tert-butyl phenyl thio-di-2-ethylhexyl phosphite.

The transesterified reaction products of organic polyhydric phenols and organic phosphite triesters free from phenolic hydroxyl groups may be obtained by heating together the phenol and phosphite ester, preferably at temperatures of from 100 to 200° C., if necessary under reflux. To expedite transesterification it is preferred to add a small amount of an alkali or alkaline earth metal oxide, hydroxide or phenolate, in amount of between about .05 to about 1% by weight. Although it is not necessary that transesterification be complete, it is believed that only the transesterification product is suitable for use in stabilizing about equimolar ethylene/chlorotrifluoroethylene copolymers during melt processing in accordance with the present invention because only they have sufficiently high boiling points to ensure their presence during fabrication by melt processing at temperatures of up to about 320° C. Usually, transesterification involving about ⅓ of the phosphite ester groups of the triphosphite and about ½ of the available phenol groups of the dihydric phenol on a mol for mol basis, may be sufficient.

The second essential component of the stabilizer system of the present invention is a salt of a monocarboxylic acid having from about 6 to about 24 carbon atoms and a metal of Group II of the Periodic Table. The metal can, for example, be any one of zinc, calcium, cadmium, barium, magnesium, and strontium. The acid can be any organic monocarboxylic acid having from 6 to about 24 carbon atoms which does not contain nitrogen. Suitable acids are also described in U.S. Pat. 3,244,650. As therein set forth, the aliphatic, aromatic, alicyclic and oxygen-containing heterocyclic organic acids are operable as a class. "Aliphatic acid" includes any open chain carboxylic acid, unsubstituted or substituted with unreactive groups such as halogens, sulfur or hydroxyl. "Alicyclic acid" includes any carbocyclic acid having a non-aromatic ring optionally substituted by an unreactive substituent, such as halogens, hydroxyl groups or alkyl and alkynyl radicals or other carbocyclic ring structures. Suitable aromatic acids can be carbocyclic or oxygen-containing heterocyclic and may be substituted by an unreactive ring substituent such as halogens, alkyl or alkenyl radicals and other saturated or aromatic rings condensed therewith. Suitable exemplary organic acids include those listed in U.S. Pat. 3,244,650, i.e. hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicyclic acid, naphthoic acid, 1-naphthalene acetic acid, orthobenzoyl benzoic acid, naphthenic acids derived from petroleum, abietic acid, dihydroabietic acid, hexanhydrobenzoic acid, and methyl furoic acid.

Organic zinc salts are preferred for use in the stabilizer compositions of the present invention, zinc-2-ethyl hexylate being a specific example of a preferred organic zinc salt.

The third essential component of the stabilizing system of the present invention, the ester or alkali metal salt of thiodipropionic acid, has the general formula:

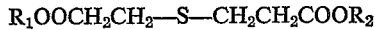

$$R_1OOCH_2CH_2-S-CH_2CH_2COOR_2$$

wherein $R_1$ and $R_2$, which may be the same or different, are independently selected from the group consisting of hydrogen, alkali metals, straight chain or branched chain alkyl radicals having from 1 to 36 carbon atoms, cycloalkyl radicals having from 3 to 36 carbon atoms, akenyl radicals having from 6 to 36 carbon atoms, aryl radicals and alkaryl radicals, with the proviso that not more than one of $R_1$ and $R_2$ may be hydrogen. The alkyl, cycloalkyl, alkenyl, aryl and alkaryl radicals may be unsubstituted or may, if desired, contain unreactive inert substituents such as halogens. Exemplary $R_{12}$ groups include lithium, sodium, potassium, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethyl phenyl, naphthyl, cycohexyl, benzyl, cyclopentyl, methyl cyclopentyl, ethylcyclohexl, and naphthenyl groups.

Exemplary suitable alkali metal salts and esters of thiodipropionic acid include mono- and disodium thiodipropionate, mono- and dipotassium thiodipropionate, mixed sodium-potassium thiodipropionate, monolauryl thiodipropionate, dilauryl thiodipropionate, distearyl thiodipropionate, butyl stearyl thiodipropionate, 2-ethylhexyl lauryl thiodipropionate, di - 2 - ethylhexyl thiodipropionate, diisodecyl thiodipropionate, isodecyl phenyl thiodipropionate, benzyl lauryl thiodipropionate, benzyl phenyl thiodipropionate, the esters of fatty alcohols obtained from tallow, cotton seed oil or soya-bean oil and thiodipropionic acid. These esters as a class are known compounds. Many are commercially available. All can be prepared by methods known to those skilled in the art involving esterification of thiodipropionic acid with the corresponding alcohol.

Especially preferred for use in the composition of the present invention are disodium thiodipropionate, distearyl thiodipropionate, and dilauryl thiodipropionate.

As above stated, the transesterified reaction product of an organic polyhydric phenol and the organic phosphite triester is employed in amounts within the range of about 0.01 to about 30% by weight of the polymer. It is preferably employed in amount ranging between about 0.05 to about 6% by weight and more preferably yet, 0.1 to about 1% by weight.

Although the salt of the monocarboxylic acid and Group II metal may be employed in amount of 0.01 to 10% by weight of the polymer, it is preferred to employ 0.01 to 3%, and, more preferably yet, 0.02 to about 0.5%. In most preferred embodiments the weight ratio of the transesterified reaction product of the organic polyhydric-phenol with the organic phosphite triester and the Group II metal salt of the monocarboxylic acid ranges between about 4:1 to about 2:1.

The salt or ester of thiodipropionic acid is usually employed in amount ranging between about 0.01 to about 10% by weight of the polymer. It is preferably employed in amounts between about 0.05 and about 3% by weight, more preferably yet in amounts ranging between about 0.1 and about 1% by weight of the polymer.

These stabilizers are admixed with the copolymer using conventional mechanical procedures. The order of addition of the individual components of the stabilizer system has no influence on its effectiveness. The individual components can be added separately or be mixed prior to addition with equally effective results. Stabilizer components can be added in solution or be dry blended with the copolymer. Liquid or soluble components of the stabilizer system can be admixed with polar organic solvents containing no hydroxyl groups, such as ketones and ethers, as well as with non-polar aliphatic or aromatic solvents, such as hexane, heptane or toluene, and be sprayed onto the polymer if in finely divided form in conventional tumbling or blending devices. For molding operations, such as extrusion or injection molding, the blended mixture may be passed through an extruder and the extruded rod chopped into pellets of desired size. Alternatively, the stabilizers may be admixed with the copolymer by tumbling pellets of the copoymer, adding liquid components of the stabilizer system, tumbling again to distribute the liquid portions of the stabilizer, then adding the dry components of the stabilizer, continuing tubling to distribute the dry components evenly over the surface of the pellets, and then extruding the resultant mixture to intimately blend the copolymer and stabilizers.

DESCRIPTION OF PREFERRED EMBODIMENTS

Of the following experiments, those employing the three-component stabilizer system of the present invention illustrate specific preferred embodiments and illustrate the outstanding stabilization achieved by the stabilizing mixtures of the present invention.

The thermal stability of stabilized and unstabilized ethylene/chlorotrifluoroethylene copolymers was determined using the following procedures:

(A) Infrared method

A one-mil film of the ethylene/chlorotrifluoro ethylene copolymer is prepared by compression molding of copolymer powder in a Loomis Engineering Press or Carver Press at 260°–270° C. under loads of 8,000 to 15,000 lbs. The film is mounted on a suitable support and its infrared spectrum is recorded. The specimen is then thermally annealed in a forced draft oven in air at 200° C. for specified periods of time and its infrared spectrum is again recorded. The development of carbonyl peaks in the 1,700 cm.$^{-1}$ region is observed with time of annealing. Using absorbence at 3,000 cm.$^{-1}$ as internal standard, ratio of peak absorbence at 1,700 cm.$^{-1}$ to peak absorbence in the 3,000 cm.$^{-1}$ region is an indication of degree of oxidation of the copolymer. It was found that multiple peaks appear at the frequency range of 1,650 to 1,800 cm.$^{-1}$ during annealing in air at 200° F. the magnitude of which increases with increasing annealing time.

To demonstrate its thermal instability, an equimolar ethylene/chlorotrifluoroethylene copolymer containing about 50 mol percent of ethylene units and correspondingly about 50 mol percent of chlorotrifluoroethylene units, having a melting point of 245° C. and containing no stabilizers was subjected to thermal stability test using the above-described infrared method. Results are shown in Table I below:

TABLE I

| Annealing time in air at 200° C., hrs. | I.R. absorbence 3,000 cm.$^{-1}$ (a) | 1,700 cm.$^{-1}$ (b) | Absorbence ratio (b/c) |
|---|---|---|---|
| 0 | ---- | 0 | 0 |
| 20 | 0.132 | 0.013 | 0.1 |
| 27 | 0.190 | 0.035 | 0.184 |
| 90 | 0.189 | 0.088 | 0.465 |
| 114 | 0.184 | 0.117 | 0.636 |
| 138 | 0.184 | 0.154 | 0.832 |
| 168 | 0.180 | 0.187 | 1.04 |

A plot of annealing time vs. absorbence ratio shows a straight line indicating a fast rate of thermal oxidation of the copolymer almost immediately upon start of thermal annealing. Hence, it is clear that the unstabilized copolymer had no initial stability against thermal degradation.

When the unstabilized copolymer used in the above stability test is melt fabricated by extrusion at 270° C., then the extrudate is discolored, contains voids, and has a rough appearance and, hence, is not suitable for practical use in any of the applications indicated, supra.

(B) Volumetric method

It has been found that thermal degradation of ethylene/chlorotrifluoroethylene copolymers involves release of acidic gases. To quantitatively determine release of acidic gases upon exposure of the copolymer to elevated temperatures in the presence and absence of air (in nitrogen) 10 gram portions of the copolymer are introduced into a 50 ml. flask equipped with thermometer, an inlet tube for air or nitrogen, and an outlet leading into a known volume of 0.1 N sodium hydroxide. The flask is immersed in an oil bath maintained at 260° C., and Carrier gas (air or nitrogen) is introduced at a slow rate into the flask. Ten ml. portions of the 0.1 N sodium hydroxide are withdrawn by pipette at periodic intervals and are titrated with 0.1 N hydrochloric acid using methyl orange as indicator. The decrease in strength of the sodium hydroxide solution, with appropriate correction for volume loss of sodium hydroxide solution, is related to quantity of acidic gases evolved.

A portion of the unstabilized about equimolar ethylene/chlorotrifluoroethylene copolymer used in the above infrared test was subjected to the volumetric thermal stability test in air as well as in nitrogen atmosphere. The results are summarized in Table II below.

TABLE II
(a) Air Atmosphere

| Δt, min. | 0.1N HCl titer, ml. | HX, mmoles evolved |
|---|---|---|
| 0 | 10 | 0 |
| 15 | 9.70 | 1.47 |
| 15 | 9.50 | 2.40 |
| 15 | 9.25 | 3.52 |
| 15 | 9.05 | 4.37 |
| 15 | 8.90 | 4.95 |
| 15 | 8.90 | 4.95 |
| 15 | 8.55 | 6.23 |
| 15 | 8.35 | 6.93 |

(b) Nitrogen Atmosphere

| Δt, min. | 0.1N HCl titer, ml. | HX, mmoles evolved |
|---|---|---|
| 0 | 10 | 0 |
| 3 | 9.90 | 0.50 |
| 10 | 9.25 | 3.68 |
| 7 | 9.00 | 4.80 |
| 10 | 9.60 | 6.58 |
| 10 | 8.35 | 7.68 |
| 20 | 7.85 | 9.67 |
| 20 | 7.45 | 11.22 |
| 45 | 6.70 | 14.19 |

These data, again, indicate that thermal degradation of the copolymer starts immediately upon exposure to elevated temperaures. They also show clearly that, surprisingly, thermal decomposition of the copolymer proceeds at a much more rapid pace in nitrogen than it does in air.

Various stabilizers known to be effective for stabilization of ethylene or chlorotrifluoroethylene homopolymers were incorporated into an equimolar ethylene/chlorotrifluoroethylene copolymer containing about 50 mol percent of units derived from ethylene having a melting point of 245° C. The blends so obtained were subjected to the infrared test above-described. The results are summarized in Table III, below. In this table the effective service period is the period of time during which the absorbence peak ratio in the 1,700 cm.$^{-1}$ and 3,000 cm.$^{-1}$ regions remained 0, indicating the period of stability against thermal oxidation. Test 8 shown in Table III clearly illustrates the superior performance of a stabilizer system according to the present invention. The stabilized compositions were prepared by dry blending insoluble stabilizer components with the polymer in finely divided form in a ball mill, adding soluble stabilizer components in suitable solvents, mixing the solution with the polymer, and stripping the solvent.

TABLE III

| Test No. | Stabilizer | Amount of stabilizer, phr. | Effective service period, hrs. at 200° C. |
|---|---|---|---|
| 1 | None | ---- | 24 |
| 2 | 4,4′-thio bis(6-tert. butyl metacresol) | 0.3 | 24 |
| 3 | 4,4′-thio bis(6-tert. butyl metacresol) and Distearylthiodipropionate | 0.3 0.1 | 27 |
| 4 | 4,4′-thio bis(6-tert. butyl metacresol) and Epoxidized soya bean oil | 0.5 1.0 | 24 |
| 5 | Butylated hydroxytoluene and Distearylthiodipropionate | 0.3 0.1 | 27 |
| 6 | Hydroquinone and Zinc oxide | 0.25 0.05 | 110 |
| 7 | Chloranil and Zinc oxide | 0.2 0.2 | [1] 160 |
| 8 | Phosphite of 1,1,3-tris (2-methyl-4-hydroxy-5-tert. butylphenyl)-butane, and Zinc-2-ethylhexylate and Distearyl thiodipropionate | 0.25 0.05 0.15 | 540 |

[1] Discoloration developed after 24 hrs. at 200° C.

Dry powdered ethylene/chlorotrifluoroethylene copolymer of about 40 mesh particle size containing about 50% of ethylene units having a melting point of 245° C. and a melt index of 0.13 determined according to ASTM D1238–65T, was mixed in a ball mill for a period of 1 to 2 hours with various amounts of stabilizers in accordance with the present invention. Portions of the resin blend were then charged into a melt rheometer, preheated to 275° C., and after 6 minutes residence time under load the melt index was determined according to ASTM D1238-65T. The load was then removed and the molten resin was left in the rheometer for a period of about 15 minutes. Its melt index was then redetermined until signs of deterioration, i.e. discoloration, roughness, bubble appearance, or changes in melt index were observed on the extrudates. The results of this test are summarized in Table IV below.

The above tests were repeated as above-described but using the high load melt index (21,600 gm. wt.) in the test. The results are summarized in Table V below. The initial high load melt index of the resin was 6.7.

Dry powdered ethylene/chlorotrifluoroethylene copolymer of about 40 mesh particle size containing about 50% of ethylene units having a melting point of 245° C. and a melt index of about 2 determined according to ASTM D1238-65 are mixed in a ball mill for periods of 1 to 2 hours with various amounts of stabilizers, including stabilizer systems according to the present invention. Portions of the resin blends are then charged into a melt rheometer, as described in ASTM D1238-65T, maintained at 275° C. and placed under 12,176 grams load. Cuts of the extrudate were taken at one minute intervals, and their weights were determined. Results are summarized in Table VI below.

TABLE IV

| Test number | Phosphite of 4,4-n-butylidenebis-(6-tert.-butyl-m-cresol), phr. | Zinc-2-ethylhexylate, phr. | Distearyl-thiodipropionate, phr. | Time, min.[1] | Melt Index | Appearance at end of test |
| --- | --- | --- | --- | --- | --- | --- |
| 1 | 0.22 | 0.08 | 0 | 45 | 0.10 | Discolored, rough. |
| 2 | 0 | 0 | 0.3 | 6 | 0.13 | Charred. |
| 3 | 0.22 | 0.08 | 0.1 | 57 | 0.12 | Clear, smooth, no bubbles. |
| 4 | 0.075 | 0.025 | 0.3 | 16 | 0.12 | Bubbles, roughness. |
| 5 | 0.22 | 0.08 | 0.3 | 17 | 0.08 | Clear, smooth. |
| 6 | 0.075 | 0.025 | 0.03 | 36 | 0.11 | Slightly discolored. |
| 7 | 4.5 | 1.5 | 2.0 | 16 | 0.30 | Discolored, rough. |
| 8 | 22 | 8 | 10.0 | 16 | 2.0 | Discolored. |
| | Phosphite of 1,1,3-tris(2-methyl-4-hydroxy-5-tert-butylphenyl) butane, phr. | | | | | |
| 9 | 0.22 | 0.08 | 0 | 82 | 0.10 | Clear, bubbles. |
| 10 | 0.22 | 0.08 | 0.1 | 16 | 0.13 | Rough, bubbles. |
| 11 | 0.075 | 0.025 | 0.3 | 50 | 0.10 | Discolored. |
| 12 | 0.22 | 0.08 | 0.3 | 82 | 0.08 | Do. |

[1] Time elapsed to first observed appearance of visual signs of deterioration.

TABLE V

| Test number | Phosphite of 4,4-n-butylidene-bis-(6-tert.butyl-m-cresol), phr. | Zinc-2-ethylhexylate, phr. | Distearyl-thiodipropionate, phr. | Time, min.[1] | High load, melt index | Appearance at end of test |
| --- | --- | --- | --- | --- | --- | --- |
| 1 | 0 | 0 | 0 | 15 | | Charred, blistered. |
| 2 | 0.22 | 0.08 | 0.1 | 68 | 6.7 | Smooth, clear. |
| 3 | 0.22 | 0.08 | 0.3 | 68 | 6.8 | Some bubbles appeared. |
| 4 | 0.22 | 0.08 | 0.04 | 38 | 6.8 | Bubbles—discoloration. |
| 5 | 0.22 | 0.08 | 0.07 | 68 | 6.8 | Smooth, clear. |
| 6 | 0.22 | 0.08 | 0.15 | 68 | 7.3 | Do. |
| | Phosphite of 1,1,3-tris(2-methyl-4-hydroxy-5-tert.-butyl-phenyl)-butane, phr. | | | | | |
| 7 | 0.22 | 0.08 | 0 | 38 | 6.6 | Bubbles—discoloration. |
| 8 | 0.22 | 0.08 | 0.1 | 38 | 6.7 | Do. |

[1] Time elapsed to first observed appearance of visual signs of deterioration.

When other phosphites or organic polyhydric phenols, salts of carboxylic acids and Group II metals, and thiodipropionic acid esters or alkali metal salts are used to stabilize ethylene/chlorotrifluoroethylene copolymers in accordance with the present invention, similar results are obtained, that is to say, the ethylene/chlorotrifluoroethylene copolymers resist thermal degradation and are melt processable at temperatures above their melting point and up to about 320° C.

Since various changes and modifications may be made in the invention without departing from the spirit and essential characteristics thereof, it is intended that all matter contained in the above description shall be interpreted as illustrative only, the invention being limited only by the scope of the appended claims.

TABLE VI

| Test No. | Stabilizer | Amount of stabilizer, percent by wt., based on polymer | Weight of 1 min. cut of extrudate, taken after indicated period [min.], normalized to g./10 mins. | | | | | Appearance of extrudate at longest indicated time period |
|---|---|---|---|---|---|---|---|---|
| | | | 5 | 30 | 60 | 90 | 120 | |
| 10 | Phosphite of 1,1,3-tris(2-methyl-4-hydroxy-5-tert.-butlyphenyl)-butane and Zinc-2-ethylhexylate and Distearyl thiodipropionate | 0.22 0.08 0.1 | 2.2 | 2.3 | 1.8 | 1.8 | | Clear with bubbles. |
| 11 | Phosphite of 4,4-n-butylidenebis-(6-tert.-butyl-m-cresol) and Zinc-2-ethylhexylate and Distearyl thiodipropionate | 0.22 0.08 0.1 | 1.9 | 1.9 | 2.0 | 1.9 | 2.0 | Do. |
| 12 | Phosphite of 1,1,3-tris(2-methyl 4-hydroxy-5-tert.-butylphenyl)-butane and Zinc-2-ethylhexylate and Disodium thiodipropionate | 0.22 0.08 0.1 | 1.6 | 1.7 | 1.8 | 1.8 | 1.8 | Do. |
| 13 | Phosphite of 4,4-n-butylidene bis-(6-tert.-butyl-m-cresol) and Zinc-2-ethylhexylate and Disodium thiodipropionate | 0.22 0.08 0.1 | 2.3 | 2.4 | 1.9 | | | Do. |

We claim:

1. A copolymer composition having improved thermal stability which comprises an admixture of an ethylene/chlorotrifluoroethylene copolymer containing about 40 to about 60 mol percent of ethylene units and about 40 to about 60 mol percent of chlorotrifluoroethylene units, and
   (a) 0.01 to 30 percent by weight of the polymer of a transesterified reaction product obtained from an organic polyhydric phenol selected from the group consisting of 1,1,3-tri(2-methyl-4-hydroxy-5-tert. butyl phenyl) butane and the phenol of the formula

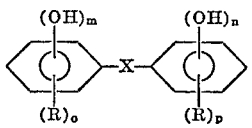

wherein X is selected from the group consisting of oxygen, sulfur, alkylene, alicyclidene, arylidene and mixed alkylene-arylidene and alkylene-alicyclidene groups, wherein the aliphatic or cycloaliphatic portion of the molecule may be straight chain or branched chain, having from 1 to about 18 carbon atoms; wherein the R substituents, which may be the same or different, are independently selected from the group consisting of hydrogen and alkyl, straight or branched chain, having from 1 to about 18 carbon atoms; and wherein $m$ and $n$ are integers from 1 to 5, and $o$ and $p$ are integers from 0 to 4, with the proviso that the sums of $m+o$, and $n+p$ may not not exceed 5, and an organic phosphite triester free from phenolic hydroxyl groups having up to about 60 carbon atoms obtained by transesterification of the phenol and phosphite at an elevated temperature sufficient to form a homogeneous mixture;
   (b) 0.01 to 10 percent by weight of the polymer of a salt of a monocarboxylic acid having from 6 to about 24 carbon atoms and a metal of Group II of the Periodic Table; and
   (c) 0.01 to 10 percent by weight of the polymer of an ester or alkali metal salt of thiodipropionic acid.

2. The composition of claim 1 wherein the copolymer is an about equimolar ethylene/chlorotrifluoroethylene copolymer.

3. The composition of claim 1 wherein the transesterified reaction product is obtained from an organic phosphite having the formula $(Ra)_3P$ wherein $a$ is selected from the group consisting of oxygen, sulfur and mixtures thereof, and R is selected from the group consisting of aryl, alkyl, cycloalkyl, aryl-alkyl and alkyl-aryl.

4. The composition of claim 3 wherein the copolymer is an about equimolar ethylene/chlorotrifluoroethylene copolymer.

5. The composition of claim 1 wherein the salt of a monocarboxylic acid is a zinc salt.

6. The composition of claim 3 wherein the salt of a monocarboxylic acid is a zinc salt.

7. The composition of claim 6 wherein the copolymer is an about equimolar ethylene/chlorotrifluoroethylene copolymer.

8. The composition of claim 1 wherein the transesterified reaction product is a phosphite of 4,4'-n-butylidene-bis(6-tert.-butyl-m-cresol) or 1,1,3-tris(2-methyl-4-hydroxy-5-tert.butylphenyl)butane.

9. The composition of claim 8 wherein the salt of a monocarboxylic acid is a zinc salt.

10. The composition of claim 9 wherein the copolymer is an about equimolar ethylene/chlorotrifluoroethylene copolymer.

11. The composition of claim 1 wherein the transesterified reaction product is a phosphite of 4,4'-n-butylidene-bis-(6-tert.butyl-m-cresol) or 1,1,3-tris(2-methyl-4-hydroxy-5-tert.-butylphenyl)butane, wherein the salt of a monocarboxylic acid is zinc-2-ethylhexylate, and wherein the ester of thiodipropionic acid is distearyl thiodipropionate.

12. The composition of claim 11 wherein the copolymer is an about equimolar ethylene/chlorotrifluoroethylene copolymer.

13. The composition of claim 1 containing 0.05 to 6 percent by weight of the polymer of a phosphite of 4,4'-n-butylidene-bis(6-tert.butyl-m-cresol) or 1,1,3-tris(2-methyl-4-hydroxyl-5-tert.-butylphenyl)butane, 0.01 to 3 percent by weight of the polymer of zinc-2-ethylhexylate, and 0.05 to 3 percent by weight of the polymer of distearyl dithiodipropionate.

14. The composition of claim 13 wherein the copolymer is an about equimolar ethylene/chlorotrifluoroethylene copolymer.

15. A copolymer composition according to claim 1 containing 0.1 to 1 percent by weight of the polymer of phosphite of 4,4'-n-butylidene-bis-(6-tert.-butyl-m-cresol), 0.02 to 0.5 percent by weight of the polymer of zinc-2-ethylhexylate, and 0.1 to 1 percent by weight of the polymer of distearyl dithiodipropionate.

16. The composition of claim 15 wherein the copolymer is an about equimolar ethylene/chlorotrifluoroethylene copolymer.

References Cited

UNITED STATES PATENTS

| 3,245,926 | 4/1966 | Parker | 260—23 |
| 3,281,381 | 10/1966 | Hechenbleikner | 260—23 |
| 3,346,536 | 10/1967 | Kauder et al. | 260—23 |
| 3,255,136 | 6/1966 | Hecker et al. | 260—23 |
| 3,501,446 | 3/1970 | Regazzini et al. | 260—87.5 |

DONALD E. CZAJA, Primary Examiner

V. P. HOKE, Assistant Examiner

U.S. Cl. X.R.

260—45.7 P, 45.75 R, 45.85 R, 45.85 S, 45.95 C, 45.95 G, 45.95 R

UNITED STATES PATENT OFFICE
CERTIFICATE OF CORRECTION

Patent No. 3,745,145       Dated July 10, 1973

Inventor(s) Ghazi Khattab and Alfred Stoloff

It is certified that error appears in the above-identified patent and that said Letters Patent are hereby corrected as shown below:

Column 2, line 47, "0.01 to 30 by weight" should read -- 0.01 to 30% by weight --.

Column 2, line 50, "hydroxy" should read -- hydroxyl --.

Column 2, line 56, "melt" should read -- metal --.

Column 3, line 30, "monomers of" should read -- monomers at --.

Column 3, line 39, "products" should read -- product --.

Column 3, line 41, "inthe" should read -- in the --.

Column 5, line 47, "$R_1OOCH_2CH_2$" should read -- $R_1OOCCH_2CH_2$ --.

Column 6, line 56, "tubling" should read -- tumbling --.

Column 7, Table I, under heading "1,700 cm.$^{-1}$ (b), 6th line, "0.154" should read -- 0.153 --.

Column 8, Table II, under heading "0.1N HCl titer, ml. (b) Nitrogen Atmosphere", 5th line, "9.60" should read -- 8.60 --.

Column 10, line 68, "meling" should read -- melting --.

Column 11, line 38, "1,1,3-tri" should read -- 1,1,3-tris --.

Column 12, line 45, "hydroxy-5" should read -- hydroxyl-5 --.

Signed and sealed this 27th day of November 1973.

(SEAL)
Attest:

EDWARD M. FLETCHER, JR.
Attesting Officer

RENE D. TEGTMEYER
Acting Commissioner of Patents